United States Patent
Han et al.

(10) Patent No.: US 12,311,435 B2
(45) Date of Patent: May 27, 2025

(54) PREPARATION METHOD FOR ALUMINUM ALLOY CAVITY CASTING FILLED WITH SPECIAL-SHAPED FOAMED ALUMINUM

(71) Applicant: CITIC Dicastal Co., Ltd., Qinhuangdao (CN)

(72) Inventors: Xing Han, Qinhuangdao (CN); Haifeng Liu, Qinhuangdao (CN); Yu Sun, Qinhuangdao (CN); Xinlei Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 141 days.

(21) Appl. No.: 17/775,453

(22) PCT Filed: Oct. 20, 2020

(86) PCT No.: PCT/CN2020/122015
§ 371 (c)(1),
(2) Date: May 9, 2022

(87) PCT Pub. No.: WO2021/179606
PCT Pub. Date: Sep. 16, 2021

(65) Prior Publication Data
US 2022/0395894 A1    Dec. 15, 2022

(30) Foreign Application Priority Data

Mar. 10, 2020    (CN) .......................... 202010160906.5

(51) Int. Cl.
*B22D 21/00*    (2006.01)
*B22C 9/10*    (2006.01)
(Continued)

(52) U.S. Cl.
CPC .............. *B22D 21/007* (2013.01); *B22C 9/10* (2013.01); *B22D 18/04* (2013.01);
(Continued)

(58) Field of Classification Search
CPC .... B22D 19/0081; B22D 21/007; B22C 9/10; B22F 3/1125
See application file for complete search history.

(56) References Cited

U.S. PATENT DOCUMENTS 3,617,345 A * 11/1971 Brown ....................... C23C 2/12
427/310
5,151,246 A * 9/1992 Baumeister ............. B22F 7/006
419/48
(Continued)

FOREIGN PATENT DOCUMENTS

| CN | 1784281 A | 6/2006 |
|---|---|---|
| CN | 101773993 A | 7/2010 |

(Continued)

OTHER PUBLICATIONS

Machine Translation, Cui, et al., CN 109465424 A, Mar. 2019. (Year: 2019).*
(Continued)

*Primary Examiner* — Kevin E Yoon
*Assistant Examiner* — Jacky Yuen
(74) *Attorney, Agent, or Firm* — IPro, PLLC

(57) ABSTRACT

The application discloses a preparation method for an aluminum alloy cavity casting filled with special-shaped foamed aluminum. The preparation method includes: preparing special-shaped foamed aluminum in a first mold by adopting a powder metallurgy foaming method; fixing the (Continued)

special-shaped foamed aluminum coated with the soldering flux in a second mold after the special-shaped foamed aluminum is coated with soldering flux; and casting by using molten aluminum alloy. According to the preparation method for the aluminum alloy cavity casting filled with the special-shaped foamed aluminum, the overall strength of the casting can be improved while the wall thickness of the casting is reduced to meet the requirement that the overall quality of the casting is not increased.

8 Claims, 1 Drawing Sheet

(51) Int. Cl.
    *B22D 18/04*     (2006.01)
    *B22D 19/00*     (2006.01)
    *B22D 25/02*     (2006.01)
    *B22F 3/11*     (2006.01)
    *B62D 7/18*     (2006.01)
    *B62D 29/00*     (2006.01)

(52) U.S. Cl.
    CPC .......... *B22D 19/0081* (2013.01); *B22D 25/02* (2013.01); *B22F 3/1125* (2013.01); *B22F 2301/052* (2013.01); *B62D 7/18* (2013.01); *B62D 29/008* (2013.01)

(56) References Cited

U.S. PATENT DOCUMENTS

| 5,293,923 A | * | 3/1994 | Alabi | ................ B22D 19/00 164/102 |
| 6,474,397 B1 | * | 11/2002 | Gunkel | ............. B22D 19/0081 164/102 |
| 2009/0050288 A1 | * | 2/2009 | Laudenklos | ....... B22D 17/2209 106/38.22 |

FOREIGN PATENT DOCUMENTS

| CN | 104550972 A | | 4/2015 |
| CN | 106222470 A | | 12/2016 |
| CN | 109465424 A | * | 3/2019 |
| CN | 109837415 A | | 6/2019 |
| DE | 19501508 C1 | | 4/1996 |
| JP | 8-9092 B2 | * | 1/1996 |
| KR | 20040083209 A | | 10/2004 |
| SU | 334031 A1 | * | 4/1972 |

OTHER PUBLICATIONS

Machine translation of Ersoy (DE 19501508 C1, published Apr. 25, 1996, cited in IDS filed May 9, 2022). (Year: 1996).*

* cited by examiner

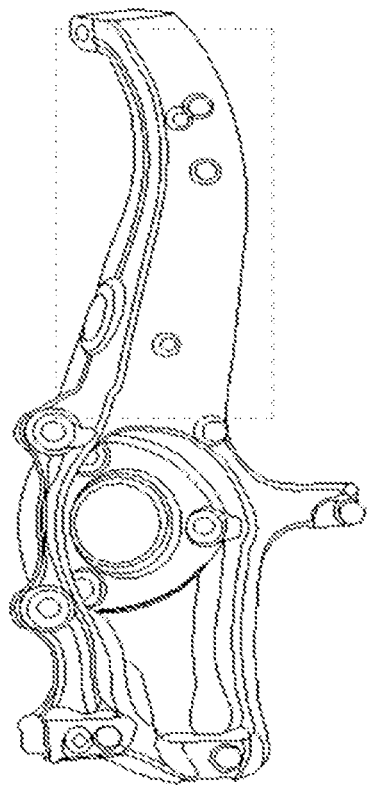
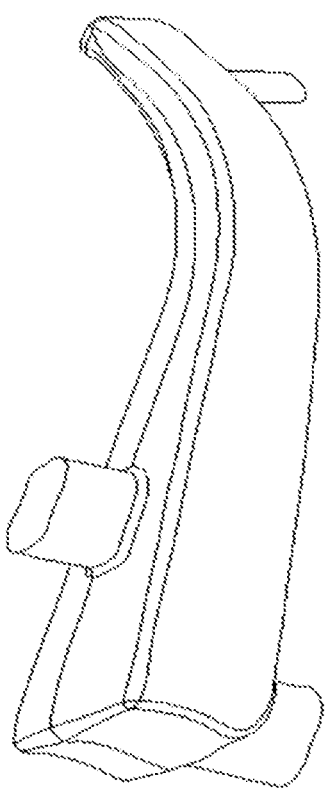
Fig. 1A    Fig. 1B
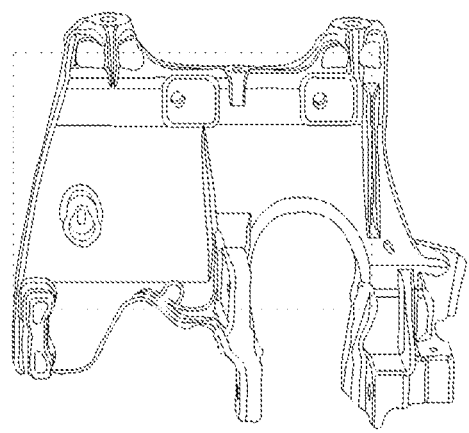
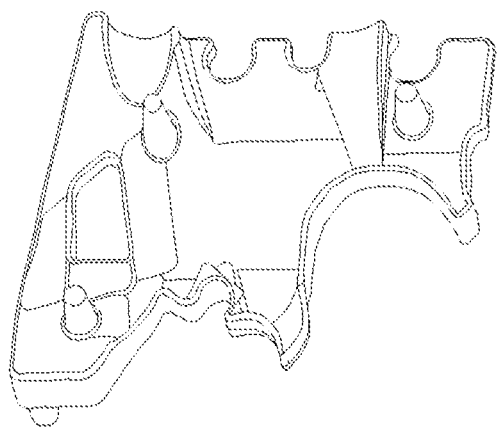
Fig. 2A    Fig. 2B

PREPARATION METHOD FOR ALUMINUM ALLOY CAVITY CASTING FILLED WITH SPECIAL-SHAPED FOAMED ALUMINUM

TECHNICAL FIELD

The invention belongs to the field of aluminum alloy castings, and particularly relates to a preparation method for an aluminum alloy cavity casting filled with special-shaped foamed aluminum.

BACKGROUND

Since the twenty-first century, under the background of economic globalization and continuous acceleration of technical progress, the world automobile industry, especially the automobile industry in China, enters a period of rapid development, however, oversized automobile production and consumption scale brings about a severe energy safety situation and huge environmental protection pressure. Therefore, a road that the automobile industry must develop new energy automobiles and realize light weight of the automobiles is determined.

At present, practical automobile light weight is mainly achieved through three modes, namely material light weight, structure light weight and manufacturing process light weight. An aluminum alloy material is widely applied to the field of automobile industry due to the characteristics of low density, high specific strength, good corrosion resistance, excellent heat-conducting properties, easiness in processing and the like. An aluminum alloy cavity casting can realize light weight in material and structure simultaneously, and the mechanical property of the casting can be kept not to be reduced. At present, a production process of the aluminum alloy cavity casting is to perform gravity or low-pressure casting through a built-in sand core, and further, a preparation process of the sand core can be divided into an organic core manufacturing process and an inorganic core manufacturing process. The organic core manufacturing causes large pollution to the environment and can damage the body health of operators, and meanwhile, the increasingly stringent environmental protection requirement further leads to the increase of investment on environmental protection equipment. The inorganic core manufacturing can effectively reduce the pollution to the environment, but it is still difficult for the domestic inorganic core manufacturing technology to realize stable batch production. The core technology of the inorganic core manufacturing is mastered in developed countries in Europe and America, and import of corresponding equipment needs a large amount of investment, so that the production cost of aluminum alloy cavity castings is increased, and the products lose competitiveness.

Foamed aluminum is a novel light multifunctional material in which a large number of communicating or non-communicating holes are uniformly distributed in an aluminum matrix, is formed by adding an additive into pure aluminum or aluminum alloy and then carrying out a foaming process, and simultaneously has the properties of metal and a foaming material. Foamed aluminum has excellent physical properties (small density, low thermal conductivity and large specific surface area), chemical properties (strong anti-corrosion properties and corrosion resistance), mechanical properties (impact resistance, shock absorption, energy absorption and easy processing) and recoverability, and especially has the characteristics of light weight, shock resistance and energy absorption.

However, due to the fact that the special-shaped foamed aluminum with a complex shape has more inflection points and sharp corners and changes of the wall thickness are more diversified, large filling resistance is generated in the casting process, and it is easy to form the defects such as cold shut and insufficient filling.

SUMMARY

In view of this, the invention mainly aims at providing a preparation method for an aluminum alloy cavity casting filled with special-shaped foamed aluminum, and the overall strength of the casting can be improved while the wall thickness of the casting is reduced to meet the requirement that the overall quality of the casting is not increased.

In a first aspect, the invention provides a preparation method for an aluminum alloy cavity casting filled with special-shaped foamed aluminum, wherein the preparation method includes:

preparing special-shaped foamed aluminum in a first mold by adopting a powder metallurgy foaming method;

fixing the special-shaped foamed aluminum coated with the soldering flux in a second mold after the special-shaped foamed aluminum is coated with soldering flux; and casting by using molten aluminum alloy.

According to one embodiment of the invention, the step of preparing the special-shaped foamed aluminum in the first mold by adopting the powder metallurgy foaming method includes: preparing foaming precursors by a powder pressing method after pure aluminum powder and titanium hydride are uniformly mixed; putting the plurality of the foaming precursors into the preheated first mold for foaming; and taking out the foamed material after heat preservation, and cooling.

Specifically, the special-shaped foamed aluminum is prepared by adopting the powder metallurgy foaming method, firstly, pure aluminum powder and a foaming agent are mixed, and foaming precursors are prepared by the powder pressing method; then, the first mold is put into a heating furnace to be preheated to about 700° C.; then, according to a shape of the special-shaped foamed aluminum, the plurality of the foaming precursors are put into the first mold according to pre-designed positions; and finally, after heat preservation is conducted for 3-5 min, the special-shaped foamed aluminum is taken out and rapidly cooled.

Wherein the foaming agent can be titanium hydride or zirconium hydride, but is not limited thereto. According to one embodiment of the invention, the foaming agent can be titanium hydride, and the usage amount of the titanium hydride is 0.5-1.5 wt % of the total weight. The foaming precursors can be prepared into relatively regular shapes such as a rod shape or a plate shape. The plurality of the foaming precursors are put into the first mold, the foaming agent is decomposed under the high-temperature condition, bubbles are formed in molten aluminum, and near-net-shaped special-shaped foamed aluminum can be prepared. Meanwhile, the cooling can be strong wind cooling or water mist cooling.

According to one embodiment of the invention, the isovolumetric density of the special-shaped foamed aluminum is 0.2-0.4 g/mm$^3$, and the thickness of a surface shell is 1-2 mm.

The foamed aluminum can be divided into closed-cell foamed aluminum and through-cell foamed aluminum generally according to a pore structure, pores of the closed-cell foamed aluminum do not communicate with one another, the porosity is 80% or above, and the pore diameter is generally 2-5 mm; holes of the through-hole foamed aluminum communicate with one another, the porosity is 60-75%, and the pore diameter is generally 0.8-2 mm. The special-shaped foamed aluminum in the invention is closed-cell foamed aluminum, the density of the special-shaped foamed aluminum is small and is only 0.2-0.4 g/mm$^3$, and the special-shaped foamed aluminum has the properties of metal and bubbles and has the advantages of being high in impact absorption capacity, resistant to high temperature, high in fireproof performance, resistant to corrosion, capable of insulating sound and reducing noise, low in heat conductivity, high in electromagnetic shielding performance, high in weather resistance, recoverable and the like.

Moreover, the surface shell is a thin shell formed on a surface layer of the special-shaped foamed aluminum in the process of preparing the special-shaped foamed aluminum by the powder metallurgy foaming method, and is substantially a solidified layer formed by solidifying aluminum melt foam in the cooling process. The thickness of the surface shell is limited to be 1-2 mm, which facilitates filling of the molten aluminum alloy in the follow-up casting process, and avoids collapse caused by remelting the special-shaped foamed aluminum in the filling process.

Specifically, the aluminum alloy cavity casting is filled with the special-shaped foamed aluminum, so that the casting has the advantages of the aluminum alloy cavity casting and the foamed aluminum at the same time, and the overall strength of the casting is greatly improved. Therefore, on the premise that the performance of the casting is guaranteed, the wall thickness of the casting is reduced, and mass increase caused by use of special-shaped foamed aluminum is completely counteracted.

According to the method of the invention, the first mold and the second mold have substantially the same structure, only the size of the first mold is smaller than that of the second mold. Wherein the size difference between the first mold and the second mold is determined according to the wall thickness of a designed aluminum alloy part.

According to one embodiment of the invention, the step of coating the special-shaped foamed aluminum with the soldering flux includes: soaking the special-shaped foamed aluminum into the soldering flux which is heated to 80-100° C. for 3-10 min, then taking out the soaked special-shaped foamed aluminum, drying to form a white frost-shaped coating on the surface, heating to 500-600° C., and conducting heat preservation; preferably, the soldering flux is a potassium fluorotitanate aqueous solution with a concentration of 5-15%.

Specifically, a main function of the soldering flux is to ensure that a welding process of the special-shaped foamed aluminum and the aluminum alloy cavity casting is carried out smoothly. The soldering flux can remove oxides on the surface of the special-shaped foamed aluminum, so that the surface of the special-shaped foamed aluminum reaches necessary cleanliness, meanwhile, the surface can be prevented from being oxidized again during welding, the surface tension of the special-shaped foamed aluminum is reduced, and the welding performance is improved. As the shape of the special-shaped foamed aluminum is complex, the special-shaped foamed aluminum is directly immersed in the soldering flux in order to ensure that the surface of the special-shaped foamed aluminum can be fully covered with the soldering flux.

The soldering flux can be generally divided into an inorganic soldering flux, an organic acid soldering flux and a rosin soldering flux, and the soldering flux in the invention can be hydrochloric acid, hydrofluoric acid, sodium fluoride, potassium fluoride, zinc chloride, potassium fluorotitanate and other inorganic acids or inorganic salts. According to one example of the invention, the soldering flux can be a potassium fluorotitanate aqueous solution, and the concentration of the potassium fluorotitanate aqueous solution can be 5-15%, but is not limited thereto. The special-shaped foamed aluminum is soaked in the soldering flux for 3-10 min and then taken out and dried, the potassium fluorotitanate covers the surface of the special-shaped foamed aluminum, a white frost-shaped coating is formed, and air can be effectively isolated.

According to one embodiment of the invention, the step of fixing the special-shaped foamed aluminum coated with the soldering flux in the second mold after the special-shaped foamed aluminum is coated with soldering flux includes: heating the second mold to 350-450° C. in advance, spraying a layer of coating on the inner surface of the second mold, then putting the special-shaped foamed aluminum coated with the soldering flux on the surface into the second mold to be fixed, and closing the mold in place.

Specifically, the second mold is heated to 350-450° C. in advance, so that on one hand, the defects of difficult molding, casting cracks and the like due to low mold temperature can be avoided; and on the other hand, the situation that the mold is damaged due to the fact that the temperature change of the mold is too large and the cold and hot stress is large can be avoided. Afterwards, dust on the surface of the cavity of the second mold can be completely removed by spraying through an air gun, so that defects are prevented from being generated on the surface of the casting in the casting process.

The sprayed coating is an essential auxiliary raw material for producing high-quality castings, and has the main functions of protecting a metal mold, facilitating demolding of the castings, improving the surface quality of the castings and controlling the heat transfer rate. The whole solidification process of the molten aluminum alloy in the mold must be effectively controlled in order to improve the surface quality of the aluminum alloy casting, so that the most important function of a second mold inner coating is to form a heat insulation layer on the inner surface of the mold and control the heat transfer rate of the high-temperature molten aluminum alloy to the mold. The coating is usually prepared by taking water as a carrier and adding a high-temperature adhesive and a refractory material, and the thickness of the coating can be 150-250 μm.

According to one embodiment of the invention, the step of casting includes pouring the molten aluminum alloy of 660-700° C. into the second mold where the special-shaped foamed aluminum is fixed. Specifically, the molten aluminum alloy can be firmly welded to the special-shaped foamed aluminum through the soldering flux, and even under the high-temperature condition, the special-shaped foamed aluminum and the aluminum alloy cavity casting can be tightly welded. The coating is beneficial to demolding of the aluminum alloy casting, so that the surface quality of the aluminum alloy casting is guaranteed. Further, when the aluminum alloy cavity casting filled with the special-shaped foamed aluminum is applied to the field of automobile manufacturing, for example, a steering knuckle component and an auxiliary frame component of a chassis, it can be guaranteed that welding between the special-shaped foamed aluminum and the aluminum alloy cavity casting is firm even under the condition that an automobile runs and vibrates for a long time.

Specifically, the molten aluminum alloy needs to be sequentially subjected to the processes of melting, refining, component adjusting, refining and modifying, slag and hydrogen measuring, standing and heat preservation before casting. The refining is to purify the molten aluminum alloy and remove aluminum oxide slag and gas in the molten aluminum alloy, so that the defects of the casting are avoided. Then, components in the molten aluminum alloy need to be analyzed before component adjusting, and the components of the molten aluminum alloy can be adjusted according to the needed aluminum alloy casting. The refining and modifying is to add a modifier into the molten aluminum alloy to form a large number of dispersed crystal nucleuses, so that fine casting grains are obtained. Due to the fact that the high hydrogen content in the molten aluminum alloy is a main reason for generating pinholes in the casting, if the hydrogen content in the molten aluminum alloy can be controlled, the quality of the aluminum alloy casting can be remarkably improved. Therefore, the quality of the molten aluminum alloy can be effectively controlled by subjecting the molten aluminum alloy to slag and hydrogen measuring.

The aluminum alloy used in the invention has no special limitation, and can be aluminum alloy conventionally used for vehicle parts. For example, the aluminum alloy can be A356, ZL101, ZL102, ZL104 and the like.

According to one embodiment of the invention, the preparation method further includes a step of carrying out post-treatment on the casting. Specifically, after the casting is taken out, a sprue and a riser are cut off, and machining, shot blasting and surface treatment are conducted on the casting according to product requirements. Compared with a traditional casting process of the aluminum alloy cavity casting, the method provided by the invention has the advantages that the procedures of sand vibration, sand shakeout, sand blowing, sand recycling and the like are omitted, the casting process flow is shortened, the equipment, labor and management cost is reduced, and the production efficiency is further improved. Meanwhile, when the aluminum alloy cavity casting filled with the foamed aluminum is applied to the field of automobile manufacturing, the improvement of the noise, vibration and harshness (NVH) performance of the whole automobile can completely offset the cost improvement caused by the increase of the foamed aluminum.

According to one embodiment of the invention, an aluminum alloy wall thickness of the casting is 4-8 mm.

In a second aspect, the invention provides an aluminum alloy cavity casting filled with special-shaped foamed aluminum, which is prepared by the preparation method in the first aspect of the invention. Specifically, the aluminum alloy cavity casting can be a steering knuckle component or an auxiliary frame component of a chassis, but is not limited thereto.

According to the aluminum alloy cavity casting filled with the special-shaped foamed aluminum, a traditional sand core is replaced with the foamed aluminum, the requirement for light weight is met, meanwhile, higher strength is obtained, further, the procedures of sand vibration, sand shakeout, sand blowing, sand recycling and the like are omitted, and the production efficiency is improved.

BRIEF DESCRIPTION OF THE DRAWINGS

FIG. 1A and FIG. 1B are structural schematic diagrams of a steering knuckle component of a chassis filled with foamed aluminum, wherein FIG. 1A is a steering knuckle, and FIG. 1B is special-shaped foamed aluminum filled in the steering knuckle; and FIG. 2A and FIG. 2B are structural schematic diagrams of an auxiliary frame component of a chassis filled with foamed aluminum, wherein FIG. 2A is an auxiliary frame, and FIG. 2B is special-shaped foamed aluminum filled in the auxiliary frame.

DETAILED DESCRIPTION

The technical solutions in the embodiments of the invention are clearly and completely described in combination with the embodiments of the invention and the accompanying drawings of the invention, and obviously, the described embodiments are only a part of the embodiments of the invention, but not all the embodiments of the invention. Based on the embodiments of the present invention, other embodiments obtained by those of ordinary skill in the art without creative work all belong to the scope of protection of the present invention.

The invention is further described below with reference to the illustrative examples shown in the accompanying drawings. According to the following description, the advantages in various aspects of the invention are more obvious. The same reference signs in the drawings refer to the same components. The shape and the size of each component in the schematic drawings are only used for illustration, and cannot be considered to reflect the actual shape, size and absolute position.

The preparation method for the aluminum alloy cavity casting filled with the special-shaped foamed aluminum provided by the invention generally includes the following steps:

(1) preparation of special-shaped foamed aluminum: firstly, pure aluminum powder and titanium hydride are uniformly mixed, and foaming precursors are prepared by adopting a powder pressing method; then, a plurality of foaming precursors are put into a first mold which is preheated to about 700° C. for foaming, and the foamed material is taken out after heat preservation for 3-5 min; and finally, strong wind cooling or water mist cooling is conducted to obtain the special-shaped foamed aluminum.

(2) pretreatment of the special-shaped foamed aluminum: the prepared special-shaped foamed aluminum is completely soaked into a soldering flux which is heated to 80-100° C. for 3-10 min, then the soaked special-shaped foamed aluminum is taken out, and dried to form a white frost-shaped coating on the surface; and finally, the special-shaped foamed aluminum is directly heated to 500-600° C., and heat preservation is conducted for standby application.

(3) pretreatment of molten aluminum alloy, wherein the pretreatment sequentially includes the steps of melting, refining, component adjusting, refining and modifying, and slag and hydrogen measuring; and finally, the molten aluminum alloy is subjected to heat preservation at 660-700° C. for standby application.

(4) pretreatment of a second mold: a cavity of the second mold is prepared and then put into a heating furnace to be uniformly heated to 350-450° C., and dust on the surface of the cavity is completely removed by spraying through an air gun after the heated cavity is taken out; and finally, a coating is uniformly sprayed on the surface of the cavity, heating is conducted to 350-450° C., and heat preservation is performed for later use.

(5) casting molding: the prepared special-shaped foamed aluminum is put into the preheated second mold, the mold is closed in place, and the pretreated molten aluminum alloy is poured into the mold for casting.

(6) post-treatment: the casting is taken out, a sprue and a riser are cut off, and machining, shot blasting treatment and surface treatment are conducted according to product requirements.

Embodiment 1

An aluminum alloy cavity casting of a certain type of chassis, namely a steering knuckle: the boundary dimension of the casting is 550 mm×160 mm×240 mm, the used alloy is A356, the weight is 4.25 kg, and the basic wall thickness is 6 mm. As shown in FIGS. 1A and 1B, a steering knuckle component of the chassis includes an aluminum alloy cavity casting part (a steering knuckle as shown in a dotted frame in FIG. 1A and a foamed aluminum part filled in the cavity casting (special-shaped foam aluminum filled in the steering knuckle as shown in FIG. 1B. The appearance size of the filled foamed aluminum is 300 mm×150 mm×150 mm, the filled foamed aluminum is made of pure aluminum, the weight of the filled foamed aluminum is 0.21 kg, and the isovolumetric density of the filled foamed aluminum is 0.2-0.4 g/cm³. A casting process: low-pressure casting.

Specific steps are as follows:

(1) preparation of special-shaped foamed aluminum: firstly, pure aluminum powder and titanium hydride (0.5-1.5 wt % of the total weight) are fully and uniformly mixed, and foamable precursors are prepared by adopting a powder pressing method; then, a first mold used for foaming is preheated to about 700° C. in a heating furnace; then, according to a shape of the special-shaped foamed aluminum, the plurality of the foamable precursors are put into the first mold according to pre-designed positions; and after heat preservation is conducted for 3-5 min, the special-shaped foamed aluminum is taken out and rapidly cooled, wherein a cooling mode is strong wind cooling or water mist cooling.

(2) pretreatment of the special-shaped foamed aluminum: the prepared special-shaped foamed aluminum is completely soaked into a soldering flux which is heated to 80-100° C. for 5 min, then the soaked special-shaped foamed aluminum is taken out, and dried to form a white frost-shaped coating on the surface; and finally, the special-shaped foamed aluminum is directly heated to 540° C., and heat preservation is conducted for standby application.

(3) pretreatment of molten aluminum alloy: molten aluminum with qualified chemical components is refined, modified and refined, the molten aluminum alloy is heated to 680° C., and heat preservation is performed for later use.

(4) pretreatment of a second mold: a cavity of the second mold is prepared and then put into a heating furnace to be uniformly heated to 380° C., and dust on the surface of the cavity is completely removed by spraying through an air gun after the heated cavity is taken out; and finally, a coating is uniformly sprayed on the surface of the cavity, heating is conducted to 380° C., and heat preservation is performed for later use.

(5) casting molding: the pretreated special-shaped foamed aluminum is put into the preheated second mold, the mold is closed in place, and the pretreated molten aluminum alloy is poured into the mold for casting.

(6) post-treatment: the casting is taken out, a sprue and a riser are cut off, and machining, shot blasting treatment and surface treatment are conducted according to product requirements.

In the casting process, the foamed aluminum is special-shaped closed-cell foamed aluminum, a matrix is industrially pure aluminum, the foamed aluminum is formed through direct foaming by a powder method, the thickness of a surface shell is 1.2 mm, and the isovolumetric density is 0.25 g/mm³.

Further, the soldering flux is a potassium fluorotitanate aqueous solution with a concentration of 12%.

Embodiment 2

An aluminum alloy cavity casting of a certain type of chassis, namely an auxiliary frame component: the boundary dimension of the casting is 410 mm×260 mm×210 mm, the used alloy is Salifont-36, the weight is 4.5 kg, and the basic wall thickness is 4.5 mm. As shown in FIGS. 2A and 2B, the auxiliary frame component of the chassis includes an aluminum alloy cavity casting part (an auxiliary frame as shown in a dotted frame in FIG. 2A and a foamed aluminum part filled in the cavity casting (special-shaped foam aluminum filled in the auxiliary frame as shown in FIG. 2B; the appearance size of the filled foamed aluminum is 220 mm×330 mm×130 mm, the filled foamed aluminum is made of pure aluminum, the weight of the filled foamed aluminum is 0.41 kg, and the isovolumetric density of the filled foamed aluminum is 0.2-0.4 g/cm³. A casting process: low-pressure casting.

Specific steps are as follows:

(1) preparation of special-shaped foamed aluminum: firstly, pure aluminum powder and titanium hydride (0.5-1.5 wt % of the total weight) are fully and uniformly mixed, and foamable precursors are prepared by adopting a powder pressing method; then, a first mold used for foaming is preheated to about 700° C. in a heating furnace; then, according to a shape of the special-shaped foamed aluminum, the plurality of the foamable precursors are put into the first mold according to pre-designed positions; and after heat preservation is conducted for 3-5 min, the special-shaped foamed aluminum is taken out and rapidly cooled, wherein a cooling mode is strong wind cooling or water mist cooling.

(2) pretreatment of the special-shaped foamed aluminum: the prepared special-shaped foamed aluminum is completely soaked into a soldering flux which is heated to 80-100° C. for 8 min, then the soaked special-shaped foamed aluminum is taken out, and dried to form a white frost-shaped coating on the surface; and finally, the special-shaped foamed aluminum is directly heated to 560° C., and heat preservation is conducted for standby application.

(3) pretreatment of molten aluminum alloy: molten aluminum with qualified chemical components is refined, modified and refined, the molten aluminum alloy is heated to 660° C., and heat preservation is performed for later use.

(4) pretreatment of a second mold: a cavity of the second mold is prepared and then put into a heating furnace to be uniformly heated to 420° C., and dust on the surface of the cavity is completely removed by spraying through an air gun after the heated cavity is taken out; and finally, a coating is uniformly sprayed on the surface of the cavity, heating is conducted to 420° C., and heat preservation is performed for later use.

(5) casting molding: the pretreated special-shaped foamed aluminum is put into the preheated second mold, the mold is closed in place, and the pretreated molten aluminum alloy is poured into the mold for casting.

(6) post-treatment: the casting is taken out, a sprue and a riser are cut off, and machining, shot blasting treatment and surface treatment are conducted according to product requirements.

In the casting process, the foamed aluminum is special-shaped closed-cell foamed aluminum, a matrix is industrially pure aluminum, the foamed aluminum is formed through direct foaming by a powder method, the thickness of a surface shell is 1.5 mm, and the isovolumetric density is 0.4 g/mm³.

Further, the soldering flux is a potassium fluorotitanate aqueous solution with a concentration of 10%.

The above are only the preferred embodiments of the invention, and does not limit the patent range of the invention, and the equivalent structure transformation made by using the contents of the description and the drawing of the invention or the direct/indirect application in other related technical fields under the conception of the invention is included in the patent protection range of the invention.

The invention claimed is:

1. A preparation method for an aluminum alloy cavity casting filled with foamed aluminum, characterized in that the preparation method comprises:
preparing foamed aluminum in a first mold by adopting a powder metallurgy foaming method, the foamed aluminum is closed-cell foamed aluminum with pores not communicating with one another, a surface shell is formed on a surface layer of the foamed aluminum, and the surface shell is a solidified layer formed by solidifying aluminum melt foam in a cooling process;
coating the foamed aluminum with soldering flux by soaking the foamed aluminum in the soldering flux which is heated to 80-100° C. for 3-10 min, the soldering flux is a potassium fluorotitanate aqueous solution with a concentration of 5-15%, a coating of potassium fluorotitanate is formed on surface of the foamed aluminum after drying;
fixing the foamed aluminum coated with the soldering flux in a second mold with a layer of coating on an inner surface of the second mold, the coating is prepared by taking water as a carrier and adding a high-temperature adhesive and a refractory material; and
casting by using molten aluminum alloy,
wherein the step of preparing the foamed aluminum in the first mold by adopting the powder metallurgy foaming method comprises:
preparing foaming precursors by a powder pressing method after pure aluminum powder and titanium hydride are uniformly mixed;
putting a plurality of the foaming precursors into the first mold for foaming to form a foamed material, wherein the first mold is preheated; and
taking out the foamed material after heat preservation, and cooling.

2. The preparation method according to claim 1, characterized in that the isovolumetric density of the foamed aluminum is 0.2-0.4 g/mm³, and the thickness of the surface shell is 1-2 mm.

3. The preparation method according to claim 1, characterized in that the step of coating the foamed aluminum with the soldering flux comprises:
taking out the soaked foamed aluminum, drying, heating to 500-600° C., and conducting heat preservation.

4. The preparation method according to claim 1, characterized in that the step of fixing the foamed aluminum coated with the soldering flux in the second mold after the foamed aluminum is coated with soldering flux comprises:
heating the second mold to 350-450° C. in advance,
spraying a layer of coating on the inner surface of the second mold,
then putting the foamed aluminum coated with the soldering flux into the second mold to be fixed, and
closing the second mold in place.

5. The preparation method according to claim 1, characterized in that the step of casting comprises pouring the molten aluminum alloy of 660-700° C. into the second mold where the foamed aluminum is fixed.

6. The preparation method according to claim 1, characterized in that the preparation method further comprises a step of carrying out post-treatment on the casting.

7. The preparation method according to claim 1, characterized in that an aluminum alloy wall thickness of the casting is 4-8 mm.

8. The preparation method according to claim 1, characterized in that the aluminum alloy cavity casting is a steering knuckle component or an auxiliary frame component of a chassis.

* * * * *